Patented Aug. 26, 1941

2,253,812

UNITED STATES PATENT OFFICE 2,253,812

CARBON MOLYBDENUM WELDING ROD

Robert M. Rooke, Jersey City, N. J., and Frederick C. Saacke, Astoria, N. Y., assignors to Air Reduction Company, Incorporated, New York, N. Y., a corporation of New York No Drawing. Application February 6, 1940, Serial No. 317,520

4 Claims. (Cl. 219—8)

This invention relates to rods used for gas welding, especially oxyacetylene welding.

In high-pressure steam power lines where temperatures up to 1100° F. are encountered, carbon-molybdenum alloy steel pipes are used because of their strength at high temperatures. The greater strength of such pipes, as compared with others of carbon steels, permits the use of lighter pipe of less wall thickness.

In oxy-acetylene welding of carbon-molybdenum steel pipes for high-pressure steam installations it has been the practice to upset the pipe ends and join them by a weld having a cross-section of double the section of the pipe. Ordinary low carbon steel welding rods have been used for such welds.

It is an object of this invention to provide an improved welding rod suitable for welding carbon-molybdenum alloy steel pipes with weld metal that meets present standards of tensile strength and ductility for the fusion welding of unfired pressure vessels. Another object is to provide a welding rod for joining carbon-molybdenum steel pipes with welds that will show creep rates no higher than the base metal. Creep is understood to be the slow elongation that occurs as a result of continued pressure at elevated temperatures.

The welding rod of this invention is primarily intended for welding pipes in end to end abutment and its use for that purpose will be described, but the invention can be used for other welding, such as the welding of plates.

The A. S. T. M. specification A 206—38T for carbon-molybdenum alloy steel requires a minimum tensile strength of 55,000 pounds/sq. in. The 1937 A. S. M. E. Code for Unfired pressure vessels requires a weld metal tensile strength not less than the minimum of the range of the plate which is used, and a minimum elongation of 20 per cent in two inches. It also requires a minimum free bend ductility of 30 per cent. Welds made with the rod of this invention, applied in the prescribed manner, have tensile strength and ductility in excess of these requirements.

The improved rod of this invention has a carbon content of from .02% to .30%, and contains from .10 to 1.50% manganese. For welding pipe with a manganese content of .45%, a rod analysis of .99% or slightly less gives a weld metal with about .50% manganese, about half of the manganese being lost during the welding. The rod contains not more than .05% each of phosphorus and sulphur, .05 to .40% silicon, and .20–1.00% molybdenum. The rod may contain nickel as an impurity in amounts not greater than .10% and such rods give very good results, but a nickel content of .50–.60% improves the weldability.

The preferred composition of the rod of this invention includes from .05% to .15% carbon, and has a manganese content between .80% and 1.00%. Phosphorus and sulphur which are impurities are preferably not more than .04% and .03%, respectively, and there is not more than .10% of chromium, which may also be considered an impurity. The silicon in the preferred composition is between .15% and .30%, nickel .45% to 1.50%, and molybdenum .55% to .65%.

The molybdenum in the rod makes the weld metal retain its strength at elevated temperatures and reduces creep. Experience shows that there is practically no loss of molybdenum during welding. The silicon is usually removed from the molten metal during welding, but this loss cannot be prevented without impairing the weldability of the rod.

In the preferred method of using the rod it is fused into a trough between confronting beveled ends of the pipes. Each pipe end may have a 30° angle of bevel, but an angle between 37½° and 45° is preferable. The rod is of the order of ⅛ to ¼" in diameter and is melted into the trough in layers when the wall thickness of the pipes is ⅜" or greater, approximately one layer being used for each $\tfrac{5}{32}$" of wall thickness.

If the trough is preheated ahead of the welding flames, the amount of heat to be supplied by the welding flame in order to melt the pipe ends is reduced. This permits the welding operator to use lower gas flows and simplifies the depositing of inclusion-free weld metal without overheating. With high gas flows the mo"·en puddle is more difficult to control. The preheating has the further advantage of reducing the temperature gradients and lowering thermal stresses so that the tendency to crack is minimized.

The layers of metal are deposited in continuous passes and after the last layer has been deposited, the grain structure of the weld is refined and the ductility increased by normalizing with the welding torch. For carbon-molybdenum steel the normalizing is obtained by heating to a temperature above 1600° F. and then allowing the metal to cool in still air.

The method of welding herein described should be understood as illustrative and not as limiting the uses to which the welding rod can be put. Welds made with the rod of this invention in accordance with the method described show a tensile strength in excess of 55,000 pounds/sq. in., a free bend ductility greater than 30%, and an elongation in 2 inches of more 20%.

We claim:

1. A welding rod comprising an iron alloy containing carbon .02% to .30%, manganese .10% to 1.50%, silicon .05% to .40%, and molybdenum .20% to 1.00%, and free of consequential amounts of chromium.

2. A welding rod comprising an iron alloy containing carbon .02% to .30%, manganese .10% to 1.50%, silicon .05% to .40%, molybdenum .20% to 1.00%, nickel .20% to 1.50%, and the balance substantially all iron.

3. A carbon-molybdenum steel welding rod containing carbon .05% to .15%, manganese .80% to 1.00%, silicon .15% to .30%, molybdenum .55% to 65%, and not more than .10% chromium.

4. A carbon-molybdenum steel welding rod containing carbon .05% to .15%, manganese .80% to 1.00%, silicon .15% to .30%, molybdenum .55% to .65%, nickel .45% to .65%, and not more than .10% chromium.

ROBERT M. ROOKE.
FREDERICK C. SAACKE.